March 23, 1943.  A. E. PETERSON  2,314,659

FOLDING PUSH CART FOR BABIES

Filed Dec. 9, 1940

INVENTOR,
Arnold E. Peterson
BY
ATTORNEY

Patented Mar. 23, 1943

2,314,659

UNITED STATES PATENT OFFICE 2,314,659

FOLDING PUSHCART FOR BABIES

Arnold E. Peterson, Burbank, Calif.

Application December 9, 1940, Serial No. 369,270

5 Claims. (Cl. 280—41)

This invention relates to folding push carts for babies, and it has among its salient objects:

To provide such a push cart which is simple and economical in construction and operation, easy to manipulate in the folding operation; which is streamlined and neat in appearance; which has a minimum number of parts to be moved in folding it; and which can be quickly folded into a compact and convenient form to be carried from place to place;

To provide in a push cart of the character referred to a median backbone and handle member, with hinge joint therebetween, adapted to be folded together with a seat structure adapted to be folded between them, said seat structure being automatically folded as said backbone and handle are moved toward each other;

To provide in a push cart a seat structure including a top band with a fabric seat body suspended therefrom, with openings therein for the legs of a child placed in said cart, said fabric being adapted to collapse in said top band as said seat is folded;

To provide in a push cart of the character referred to a front support for the seat structure from the front end of said backbone, said support having foot rests thereon and carrying a castor wheel in its lower end.

Other objects and advantages of my invention will appear from the following detailed description of one practical embodiment thereof, taken with the accompanying drawing, which I will now describe.

Figures 1, 2:
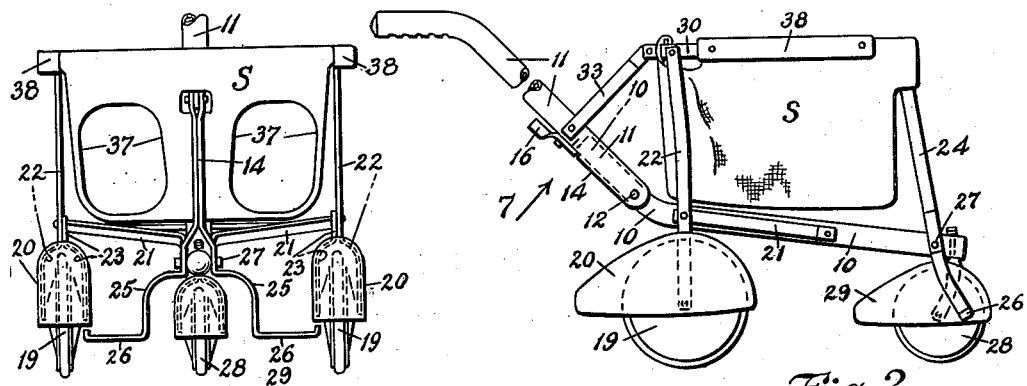
Figure 1 is a front elevation of a push cart embodying my invention, with a part of the handle broken away.
Figure 2 is a side elevation of the same, with a portion of the handle broken out to reduce the size of the figure.
Figure 7:
Figure 7 is a fragmentary, enlarged view of details as seen looking with the arrow 7 in connection with Fig. 2.
Figure 8:
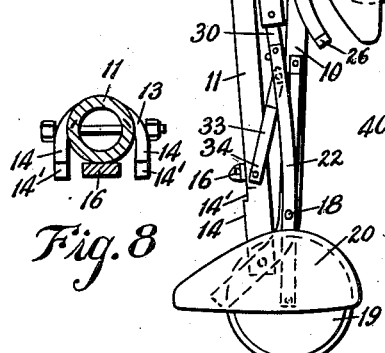
Figure 8 is a sectional view taken on the line 8—8 on Fig. 7.
Figures 5, 6, 9:
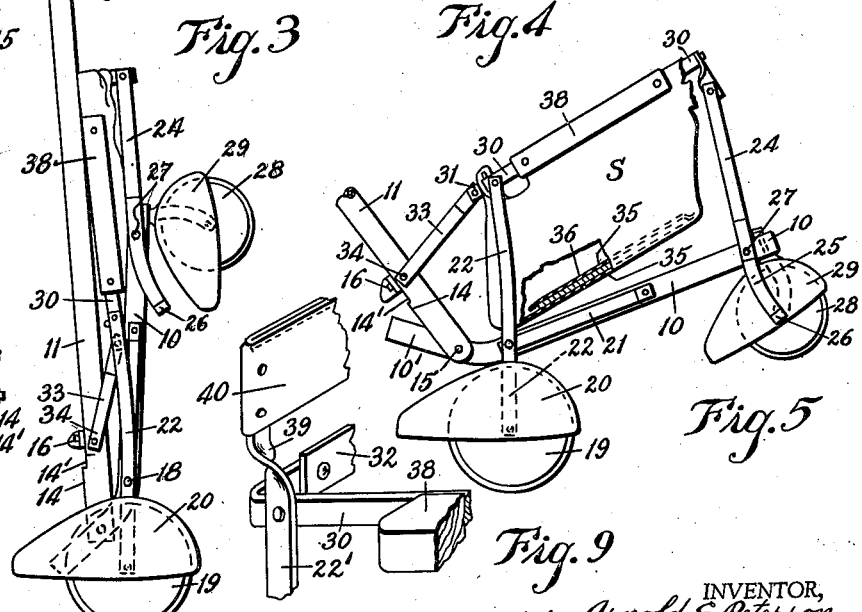
Figure 5 is a side elevation, with parts broken away, as the cart is started to fold up.
Figure 6 is a view of the cart completely folded.
Figure 9 is a fragmentary view to show how a head rest can be applied to said cart as illustrated in the other views.

Referring now in detail to the drawing, my invention as here illustrated comprises a combination backbone and handle member 10 and 11 the backbone portion being designated 10 and the handle portion being designated 11, with a hinge joint 12 therebetween. In order to form a practical hinge joint, the lower end of the handle portion 11 is transversely cut at 13 and then split and the sides opened out into a U-form, as at 14, 14, Fig. 7, while the upper end of the backbone portion 10, telescopes therein, and is pivotally connected by the bolt 15. A pivoted latch member 16 is secured to the handle portion 11, as at 17, said latch being a twisted piece of metal adapted to be turned from the locking position, shown in said Fig. 7, to a crosswise position, as seen in Fig. 5, whereby to let the end of the backbone portion 10' move out of the U-shaped end of handle portion, above described. In order to give clearance for the end of the latch 16, the sides 14, 14 are cut away at 14', 14' as seen in Figs. 5, 6 and 7, thus making it easy for the latch 16 to be turned to the position shown in Fig. 7, for holding said portions in normal alinement, as seen in Figs. 2 and 7.

Figures 3, 4:
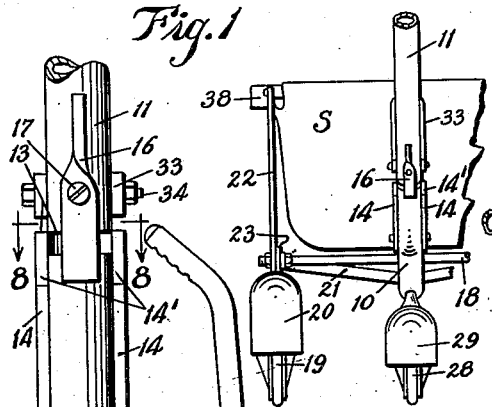
Figure 3 is a fragmentary rear view of said push cart.
Figure 4 is a plan view thereof, looking down into the structure with the fabric seat removed from the top band thereof.

A bar or axle 18 is inserted through the backbone portion 10, and projects from the opposite sides thereof to receive two wheels 19, 19 provided with streamlining hoods or pants 20, 20. Brace members 21, 21 are extended from the member 10 to the ends of said bar 18, as seen clearly in Fig. 4. Two upright supporting members 22, 22 are secured to the ends of said bar 18, and are extended down into the wheel pants 20, 20 to the wheel axles, with shorter companion members 23, 23 secured thereto and extending down into said wheel pants on the opposite sides of said wheels, for supporting the wheel axle at both ends, as will be understood from the light broken lines in Fig. 1. The bar 18 is secured in place by means of two washers 18', 18' thereon at opposite sides of the backbone portion 10, with cotter pins outside of the washers, as will be understood from Fig. 4.

At the front end of the backbone member or portion 10, is a front supporting member 24, of double construction, with the lower end arched, as at 25, 25 and terminating in foot rests 26, 26 the end of said member 10, being pivotally connected between said members, as at 27. Connected with the front or outer end of the backbone member 10, is a castor wheel 28, also covered with a streamlined hood or pants 29. This wheel and hood are so constructed and formed as to turn freely in the arched portion of the front supporting member 24, so far as is necessary.

Connected to the upper ends of the side supports 22, 22, and the front support 24, is a top band 30, having its ends turned to right angles, as at 31, with an inner strengthening strip or bar 32, riveted thereto. A connecting link 33 is pivotally connected at its upper end between the ends 31, 31 of said band, and its lower ends pivotally connected with the handle portion 11, as at 34, said link being bifurcated, as clearly seen in Fig. 4.

Suspended from said top band 30, is a fabric child's seat or chair, having the bottom 35, made double, with an insert board 36, inserted therein, as seen in the broken away place in Fig. 5. The sides, front and back are secured around the top to the band 30, in any suitable manner. I have shown the front wall provided with two openings, as 37, 37 through which the child's legs can be inserted, to reach the foot rests 26, 26. Said seat as a whole is designated S. The fabric or canvas seat structure practically collapses in the top band or frame 30, as the seat folds up, as seen in Fig. 6.

Mounted on the outer, opposite sides of the top band 30, are two side members 38, 38, which may also be tapered or somewhat streamlined. These form arm rests at opposite sides of the seat.

In Fig. 9, I have illustrated how the side supporting members 22' designated 22, 22 in the other views, can be extended upwardly and given a twist, as at 39, and a belt of canvas, or other suitable fabric 40 stretched from one side to the other, as indicated, to form a head rest, where such a head rest or back is desired. This does not interfere with the folding operation, but rests between the side members 38, 38 and the handle plane, said handle being in the middle or on the median line of the push cart.

Thus I have provided a simple and practical push cart for babies, having a main or median backbone member and handle with the horizontally extending portion under the cart and the upwardly extending portion forming the handle, with the other parts all connected therewith and folding therewith and therebetween in a simple and practical manner. I have provided a form of push cart which lends itself to the streamline treatment and which makes a most attractive child's push cart, and one which can be folded into small and convenient form to carry on a street car or placed in an automobile.

I am aware that many changes can be made in the details of construction and arrangement without departing from the spirit of my invention, and I do not, therefore, limit the invention to the particular details shown for illustrative purposes, except as I may be limited by the hereto appended claims.

I claim:

1. A folding push cart of the character shown and described which includes a median combination backbone and handle with hinge joint therebetween, wheel supporting means at the opposite sides of said backbone, wheels on the outer ends thereof, a supporting member at the front end of said backbone and having its lower end arched and terminating in foot rests at opposite sides of the arched portion, a seat for a child consisting of a top band supported above said backbone and having a fabric seat suspended therefrom with openings for the legs of a child, said top band being hingedly supported to fold flatwise against said handle, when said backbone and said handle are folded together, and means connected with said seat for causing it to fold as said backbone and handle are folded.

2. In a push cart for a child, a median backbone and handle with hinge joint therebetween, means at opposite sides for supporting wheels with wheels thereon, a folding seat including a top band wtih fabric seat body suspended therefrom, pivotally connected supporting means from said opposite sides for said top band and pivotally connected supporting means from the front end of said backbone for the front of said band, means pivotally connecting said band with said handle, whereby when said backbone and handle are folded at their hinge joint said seat band and seat supporting means are automatically folded flatwise together, said supporting means from the front end of said backbone having foot rests thereon with a supporting element therebetween for supporting the front of said cart.

3. In a push cart for a child, a combination backbone and handle with a hinge joint and latch therebetween, supporting wheels at opposite sides with streamlined hoods thereon, a front support at the front end of said backbone, said support having a castor wheel therein and foot rests thereon, a seat for a child pivotally supported above said backbone by said front support and having pivoted supports from said streamlined hoods on said side wheels, said seat being automatically foldable with said backbone and handle, and a connecting link from said handle to said seat.

4. In a folding push cart, a combination backbone and handle, the backbone portion extending substantially horizontally and the handle portion extending upwardly and rearwardly, with a hinge joint therebetween, a castor wheel at the front end of the backbone, wheel supporting means at opposite sides, near said hinge joint, with carrier wheels thereon, seat-supporting frame members pivotally connected together and to said backbone and handle and having a top band pivotally supported in the upper part of said frame members, and a child's seat supported in said top band, said supporting frame members and said top band and seat being connected to be automatically folded together in collapsed form by the folding of said backbone and handle at the hinge joint therebetween.

5. A folding push cart including a combination handle and backbone, the handle portion thereof extending upwardly and rearwardly from the backbone portion, said backbone portion extending substantially horizontally under the seat, a hinge joint between said handle and backbone portions, a seat-supporting frame pivotally supported from the front and rear ends of said backbone portion, a seat supported by said seat-supporting frame, a supporting element at the front end of said backbone portion, carrier wheels said backbone portion are folded at their hinge joint, and foot rests above said supporting element at the rearward end thereof, pivotal connections ment at the front end of said backbone portion. from the handle portion to said seat-supporting frame for automatically moving all together into collapsed form when said handle portion and

ARNOLD E. PETERSON.